US012747098B2

(12) United States Patent
Ito et al.

(10) Patent No.: US 12,747,098 B2
(45) Date of Patent: Sep. 29, 2026

(54) TRANSPORT FACILITY

(71) Applicant: Daifuku Co., Ltd., Osaka (JP)

(72) Inventors: Shota Ito, Komaki (JP); Makoto Kono, Komaki (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 19/240,610

(22) Filed: Jun. 17, 2025

(65) Prior Publication Data

US 2025/0382129 A1 Dec. 18, 2025

(30) Foreign Application Priority Data

Jun. 18, 2024 (JP) ................................ 2024-098132

(51) Int. Cl.
*B65G 1/04* (2006.01)
*B65G 43/10* (2006.01)

(52) U.S. Cl.
CPC .......... *B65G 1/0457* (2013.01); *B65G 43/10* (2013.01)

(58) Field of Classification Search
CPC .............................. B65G 1/0457; B65G 43/10
See application file for complete search history.

(56) References Cited

U.S. PATENT DOCUMENTS

2011/0178657 A1 7/2011 Harasaki
2016/0207717 A1* 7/2016 Senn ...................... B65G 54/02
2019/0318950 A1* 10/2019 Takahara ............... B61L 23/14
2024/0059497 A1* 2/2024 Jo .......................... B65G 43/02
2024/0190665 A1* 6/2024 Ueda ...................... B65G 47/57

FOREIGN PATENT DOCUMENTS

JP 2006313463 A 11/2006
WO 2010035411 A1 4/2010

* cited by examiner

*Primary Examiner* — Jacob M Amick
(74) *Attorney, Agent, or Firm* — The Webb Law Firm

(57) ABSTRACT

A transport facility includes a transport vehicle and a section control system. In a case where a following stop point is different from a leading stop point, and a following passage point is different from a leading passage point at the time when the section control system receives a passage permission request on a first passage point or a second passage point from a following transport vehicle to enter a specific section subsequently to a leading transport vehicle entering the specific section first after the section control system gives the leading transport vehicle a passage permission to pass through the first passage point or the second passage point, the section control system gives the following transport vehicle a passage permission to pass through the following passage point.

2 Claims, 3 Drawing Sheets

CASE 1

A

| | |
|---|---|
| LEADING STOP POINT | FIRST STOP POINT |
| LEADING PASSAGE POINT | FIRST PASSAGE POINT |

B

| | |
|---|---|
| FOLLOWING STOP POINT | SECOND STOP POINT |
| FOLLOWING PASSAGE POINT | SECOND PASSAGE POINT |

CASE 2

A

| | |
|---|---|
| LEADING STOP POINT | FIRST STOP POINT |
| LEADING PASSAGE POINT | FIRST PASSAGE POINT |

B

| | |
|---|---|
| FOLLOWING STOP POINT | FIRST STOP POINT |
| FOLLOWING PASSAGE POINT | SECOND PASSAGE POINT |

TRANSPORT FACILITY

CROSS-REFERENCE TO RELATED APPLICATION

This application claims priority to Japanese Patent Application No. 2024-098132 filed Jun. 18, 2024, the disclosure of which is hereby incorporated by reference in its entirety.

BACKGROUND OF THE INVENTION

1. Field of the Invention

The present invention relates to a transport facility including a transport vehicle, a travel path on which the transport vehicle travels, and a section control system configured to transmit a passage permission or a stop command to the transport vehicle traveling in a specific section defined in the travel path and control the transport vehicle.

2. Description of Related Art

For example, Japanese Patent Unexamined Application Publication No. 2006-313463 (JP 2006-313463) discloses an invention for controlling transport vehicles to pass through a merging section in which a plurality of paths are merged together. Hereinafter, reference signs described within parentheses in this Description of Related Art are reference signs used in JP 2006-313463.

A transport vehicle (5) makes a blocking request to a zone controller (11) to request blocking of other transport vehicles (5) from entering a merging section provided with a lock point, before the transport vehicle (5) enters the merging section. In a case where the zone controller (11) permits the transport vehicle (5) thus making the blocking request to pass through the merging section, the zone controller (11) gives a blocking permission and blocks the other transport vehicles (5) from passing through the merging section. After the transport vehicle (5) has passed through the merging section, the zone controller (11) releases the blocking in the merging section to allow the other transport vehicles (5) to pass through the merging section.

In the invention described in JP 2006-313463, it is determined whether or not a transport vehicle is permitted to pass through one intersection where two paths intersect with each other. Only one transport vehicle can pass through such an intersection at once, and the other transport vehicles are naturally blocked. On this account, a complicated control is not required. In the meantime, in a case where there is a section including a plurality of intersection close to each other, for example, the control easily becomes complicated to avoid interference between transport vehicles. From the viewpoint of reliability, even in such a section including a plurality of intersections, it is conceivable that only one transport vehicle is permitted to pass therethrough while the other transport vehicles are blocked. However, in this case, even when the transport vehicles are less likely to interfere with each other, the transport vehicles are unnecessarily restricted from passing through the section.

SUMMARY OF THE INVENTION

In view of such actual circumstances, a plurality of transport vehicles is desired to smoothly pass through a section including a plurality of intersections close to each other.

A technology to achieve the above object is as follows.

That is, a transport facility includes: at least one transport vehicle; a travel path on which the at least one transport vehicle travels; and a section control system configured to transmit a passage permission or a stop command to the at least one transport vehicle traveling on a specific section defined in the travel path and control the at least one transport vehicle. The specific section includes at least one stop point, at which the at least one transport vehicle stops in response to the stop command, and at least one passage point, through which the at least one transport vehicle receiving the passage permission passes. The at least one stop point includes a first stop point and a second stop point as different entrances to the specific section. The at least one passage point includes a first passage point and a second passage point as different exits from the specific section. The first passage point and the second passage point are placed downstream from the first stop point and the second stop point in the travel path. The at least one vehicle includes: a leading transport vehicle entering the specific section first to pass through a leading stop point as the at least one stop point and a leading passage point as the at least one passage point; and a following transport vehicle entering the specific section subsequently to the leading transport vehicle to pass through a following stop point as the at least one stop point and a following passage point as the at least one passage point. The section control system is configured to give the following transport vehicle a passage permission to pass through the following passage point in a case where the following stop point is different from the leading stop point, and the following passage point is different from the leading passage point at a time when the section control system receives a passage permission request on the first passage point or the second passage point from the following transport vehicle after the section control system gives the leading transport vehicle a passage permission to pass through the first passage point or the second passage point.

In this configuration, in a case where the following stop point is different from the leading stop point, and the following passage point is different from the leading passage point, the section control system gives the following transport vehicle a passage permission to pass through the following passage point. On this account, not only the leading transport vehicle but also the following transport vehicle can pass through the specific section, thereby making it possible to allow a plurality of transport vehicles present in the specific section at the same timing to smoothly pass through the specific section. With this configuration, it is possible to allow a plurality of transport vehicles to smoothly pass through a section including a plurality of intersections close to each other.

Further features and advantages of the technology according to this disclosure will become clearer by the following illustrative and nonlimiting description of embodiments to be described with reference to the drawings.

DESCRIPTION OF THE INVENTION

An embodiment of a transport facility will be described below with reference to the drawings.

Figure 1:
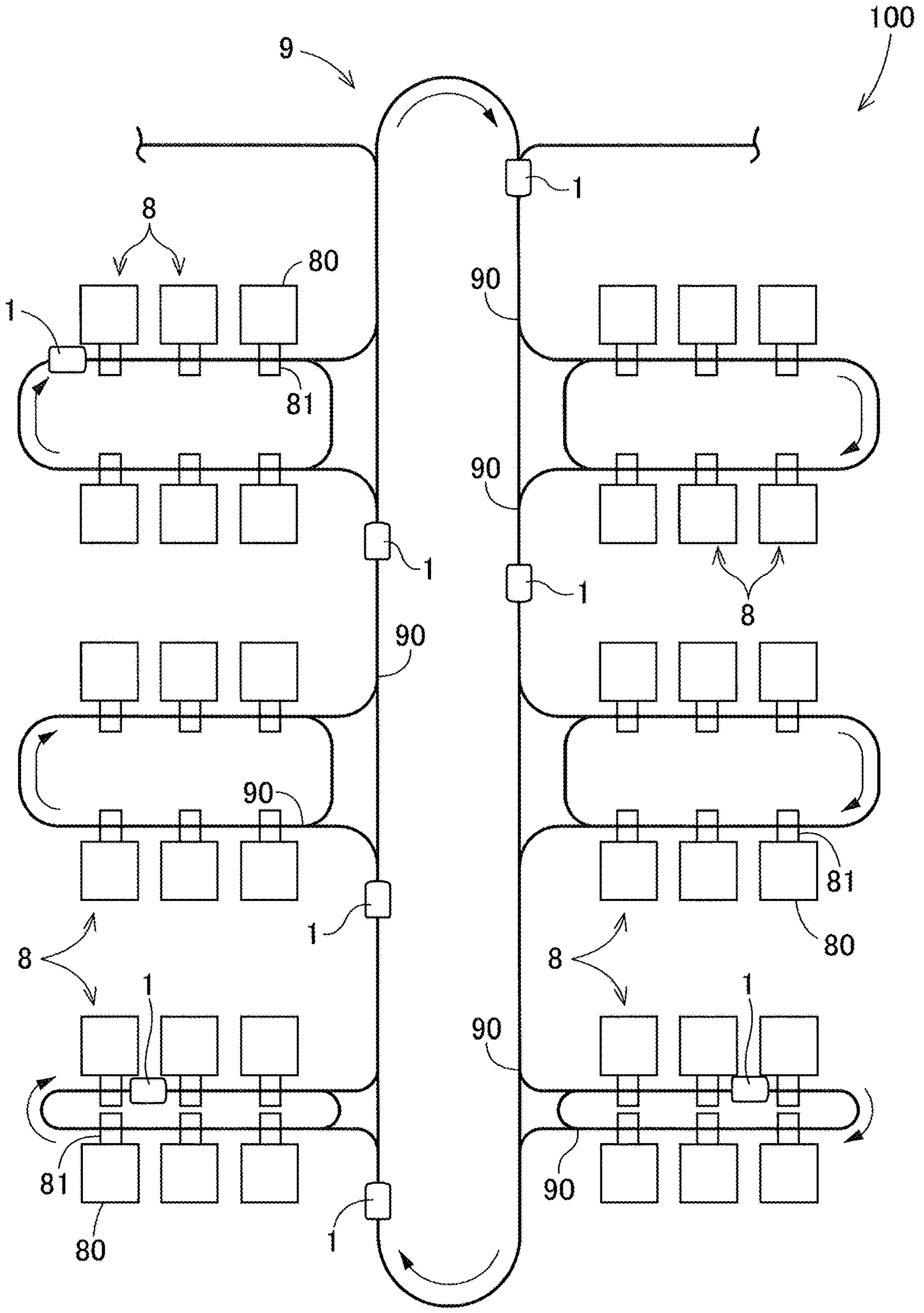
FIG. 1 is a plan view of a transport facility.

As illustrated in FIG. 1, a transport facility 100 includes a transport vehicle 1, and a travel path 9 on which the transport vehicle 1 travels. The transport vehicle 1 can be a so-called overhead transport vehicle configured to travel on traveling rails provided near a ceiling.

A plurality of transfer target areas 8 is provided along a travel path 9. The transport vehicle 1 is configured to execute a task given to the transport vehicle 1 and transports an article (not illustrated) to any of the transfer target areas 8, for example.

The transport facility 100 is used in a semiconductor factory, for example. In this case, the transfer target area 8 can be a processing device 80 configured to perform processing on the article. The article can be a FOUP (Front Opening Unified Pod) in which wafers are stored, or a reticle pod in which reticles are stored. In a case where the article is a FOUP, a target object to be processed by the processing device 80 is a wafer. In a case where the article is a reticle pod, a target object to be processed by the processing device 80 is a reticle. In the semiconductor factory described herein, the processing device 80 performs various processes such as thin-film formation, photolithography, and etching, for example. The processing device 80 is configured to perform a process on a target object taken out from articles on a mounting table 81 placed adjacent to the processing device 80. The article is transferred to the mounting table 81 by the transport vehicle 1.

The travel path 9 is provided with an intersection 90 at which a plurality of paths intersects with each other. The intersection 90 includes a branch point, at which one path branches into a plurality of paths, and a merging point, at which a plurality of paths is merged together. In the present embodiment, the travel path 9 is a one-way path, and transport vehicle 1 cannot travel in the opposite direction on the travel path 9. Accordingly, the transport vehicle 1 selects a path from the plurality of paths branching at the intersection 90 as a branch point and travels on the path thus selected. In the meantime, even when the transport vehicle 1 travels on any of the plurality of paths, the transport vehicle 1 is to travel on one path ahead of the intersection 90 as a merging point (there is no choice to select any path). Accordingly, in a case where a plurality of transport vehicles 1 is to enter the intersection 90 as a merging point from different paths at the same timing, a given one of the transport vehicles 1 is permitted to pass through the intersection 90 while the other transport vehicles 1 are blocked from passing therethrough.

Figure 2:
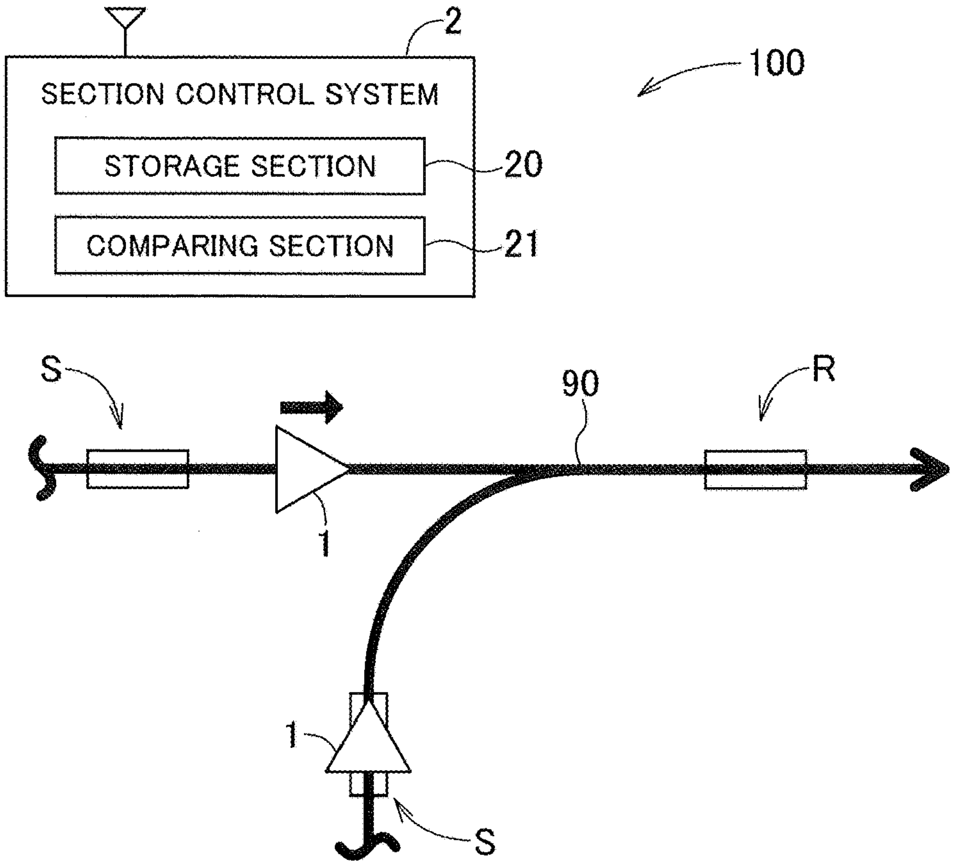
FIG. 2 is a view illustrating a control at an intersection by a section control system.

As illustrated in FIG. 2, the transport facility 100 includes a section control system 2 configured to control the transport vehicle 1 at the intersection 90. The section control system 2 includes five devices such as an input device, an output device, a storage device, a computing device, and a control device. The section control system 2 may be constituted by a plurality of sets of five devices physically apart from each other.

FIG. 2 illustrates an example in which the section control system 2 controls a plurality of transport vehicles 1 at the intersection 90.

The section control system 2 is configured to control the plurality of transport vehicles 1 by communicating with the plurality of transport vehicles 1. The communication is performed wirelessly, but wired communication may be used in at least part of a communications path.

The section control system 2 is configured to control an entering timing of each of the plurality of transport vehicles 1 in such a manner that the plurality of transport vehicles 1 sequentially passes through the intersection 90 without interfering with each other. In the transport facility 100, the section control system 2 is configured to control the transport vehicle 1 traveling on a specific section Z (see FIG. 3 or the like) defined in the travel path 9, by transmitting a passage permission or a stop command to the transport vehicle 1.

A stop point S as an entrance to a section provided with the intersection 90 as the merging point is defined upstream from the intersection 90, and a passage point R as an exit from the section provided with the intersection 90 is defined downstream from the intersection 90.

The transport vehicle 1 makes a passage permission request to the section control system 2 before the stop point S or at the stop point S.

In a case where a plurality of transport vehicles 1 makes a passage permission request, the section control system 2 gives a passage permission only to a given transport vehicle 1 and registers an exclusive passage through the passage point R for the given transport vehicle 1. This allows the given transport vehicle 1 to exclusively pass through the passage point R. The transport vehicle 1 receiving the passage permission travels at the intersection 90 to pass through the passage point R. The section control system 2 transmits a stop command to a transport vehicle 1 not receiving the passage permission. The transport vehicle 1 thus receiving the stop command stops at the stop point S and waits for a passage permission to be given by the section control system 2.

After having passed through the passage point R, the transport vehicle 1 receiving the passage permission makes an exclusive-passage release request to the section control system 2 to release the exclusive passage through the passage point R. The section control system 2 releases the registration of the exclusive passage through the passage point R in response to the exclusive-passage release request. Hereby, the passage point R is released from an exclusive-passage state, so that the section control system 2 can permit a next transport vehicle 1 to pass through the passage point R.

The passage permission request, the passage permission, the exclusive-passage release request, the stop command, and the like are transmitted and received between the section control system 2 and the transport vehicle 1 as signals. For example, the passage permission request is transmitted and received as a permission request signal. The passage permission is transmitted and received as a passage permission signal. The exclusive-passage release request is transmitted and received as a release request signal. The stop command is transmitted and received as a stop command signal.

Since the section control system 2 determines whether or not the transport vehicle 1 is permissible to pass through the intersection 90, it is possible to avoid the transport vehicles 1 from interfering with each other at the intersection 90.

In the present embodiment, the section control system 2 includes a storage section 20 and a comparing section 21.

The storage section 20 is a functional section configured to store information on the transport vehicle 1. For example, individual information, current position information, planned travel route information, passage-permission-request transmission information, speed information, and the like of the transport vehicle 1 are stored.

The comparing section 21 is a functional section configured to compare pieces of information on the transport vehicles 1 which pieces of information are stored in the storage section 20. The comparing section 21 compares pieces of planned travel route information and pieces of passage-permission-request transmission information on a plurality of transport vehicle 1 with each other, for example. In a case where the section control system 2 recognizes the possibility of interference between the transport vehicles 1 on the travel path 9 as a result of the comparison, the section control system 2 performs a control to avoid the interference. In this case, as described above, the section control system 2 gives a passage permission to one of two transport vehicles 1 and transmits a stop command to the other one.

In the transport facility 100 according to this disclosure, the section control system 2 controls the transport vehicle 1 in a specific section Z.

Figure 3:
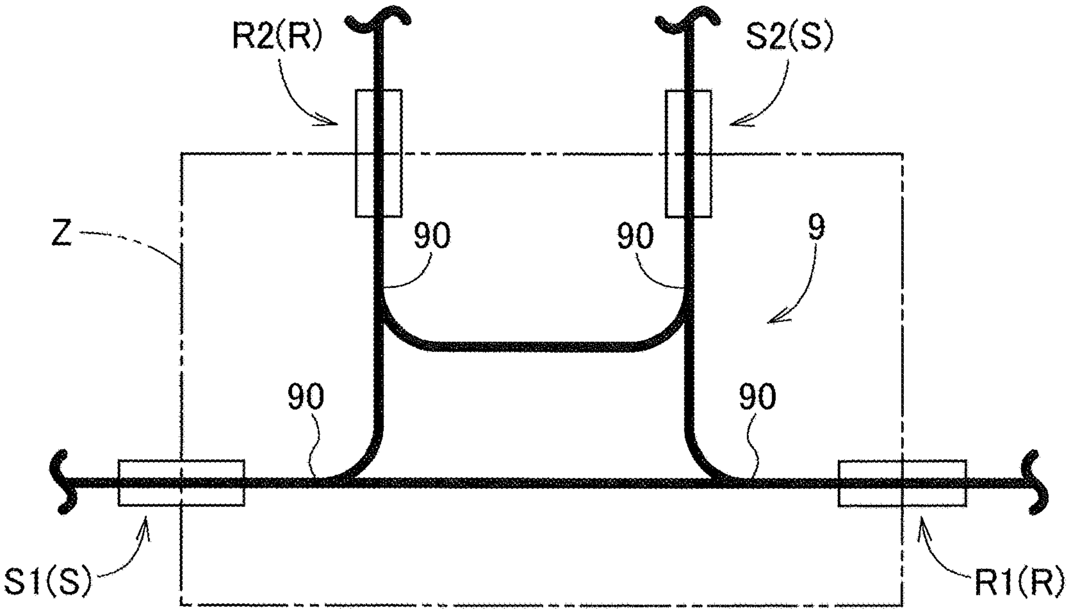
FIG. 3 is a view illustrating a specific section.

FIG. 3 illustrates the specific section Z. The specific section Z includes a stop point S, at which the transport vehicle 1 stops in response to a stop command, and a passage point R, through which the transport vehicle 1 receiving a passage permission passes.

The stop point S includes a first stop point S1 and a second stop point S2 having different entrances to the specific section Z. The passage point R includes a first passage point R1 and a second passage point R2 having different exits from the specific section Z. The first passage point R1 and the second passage point R2 are placed downstream from the first stop point S1 and the second stop point S2 in the travel path 9.

In the specific section Z, a path from the first stop point S1 to the first passage point R1 and a path from the second stop point S2 to the second passage point R2 do not interfere with each other, and a path from the first stop point S1 to the second passage point R2 and a path from the second stop point S2 to the first passage point R1 do not interfere with each other.

The following describes a control performed by the section control system 2 in the specific section Z. Note that, in a case where the section control system 2 receives a passage permission request on the first passage point R1 or the second passage point R2 from a following transport vehicle 1F as another transport vehicle 1 to enter the specific section Z subsequently to a leading transport vehicle 1L as a transport vehicle 1 entering the specific section Z first after the section control system 2 gives the leading transport vehicle 1L a passage permission to pass through the first passage point R1 or the second passage point R2, the section control system 2 determines whether or not a passage permission to the following transport vehicle 1F is issuable or not, and the section control system 2 controls the following transport vehicle 1F based on the determination result. This determination varies depending on cases. The following describes those different cases about the control performed by the section control system 2. Note that a leading stop point SL and a leading passage point RL are a stop point S and a passage point R through which the leading transport vehicle 1L passes, and a following stop point SF and a following passage point RF are a stop point S and a passage point R through which the following transport vehicle 1F passes.

Figure 4:
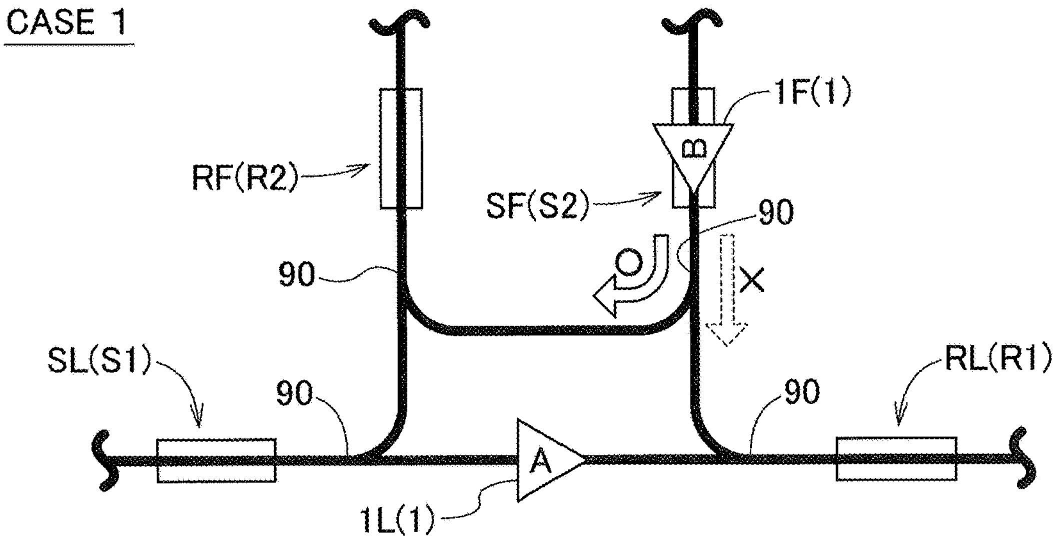
FIG. 4 is a view illustrating a control in the specific section.

FIG. 4 illustrates a case 1. In the case 1, a transport vehicle A enters the specific section Z first, and a transport vehicle B enters the specific section Z after that. Accordingly, the transport vehicle A is the leading transport vehicle 1L, and the transport vehicle B is the following transport vehicle 1F. A first stop point S1 as an entrance for the leading transport vehicle A is the leading stop point SL, and a second stop point S2 as an entrance for the following transport vehicle B is the following stop point SF. A first passage point R1 as an exit for the leading transport vehicle A is the leading passage point RL, and a second passage point R2 as an exit for the following transport vehicle B is the following passage point RF.

In a case where the following stop point SF is different from the leading stop point SL and the following passage point RF is different from the leading passage point RL, the section control system 2 gives the following transport vehicle B a passage permission to pass through the following passage point RF.

In the case 1 illustrated in FIG. 4, the following stop point SF as the entrance for the following transport vehicle B is the second stop point S2, and the leading stop point SL as the entrance for the leading transport vehicle A is the first stop point S1. Accordingly, the entrances for the following transport vehicle B and the leading transport vehicle A are different from each other. In addition, the following passage point RF as the exit for the following transport vehicle B is the second passage point R2, and the leading passage point RL as the exit for the leading transport vehicle A is the first passage point R1. Accordingly, the exits for the following transport vehicle B and the leading transport vehicle A are different from each other.

Accordingly, the traveling of the following transport vehicle B in a direction indicated by a solid-line arrow in FIG. 4 is permitted as the traveling does not affect the leading transport vehicle A. The section control system 2 gives a passage permission to the following transport vehicle B.

Note that the traveling of the following transport vehicle B in a direction indicated by a broken-line arrow in FIG. 4 is not permissible. This is because the following passage point RF as the exit for the following transport vehicle B and the leading passage point RL as the exit for the leading transport vehicle A become the same passage point, i.e., the first passage point R1. In this case, the following transport vehicle B and the leading transport vehicle A are likely to interfere with each other, so that the section control system 2 does not give a passage permission to the following transport vehicle B. That is, in a case where the following passage point RF and the leading passage point RL are the same point, the section control system 2 transmits, to the following transport vehicle 1F, a stop command to stop at the following stop point SF, without giving a passage permission to pass through the following passage point RF to the following transport vehicle 1F.

Figure 5:
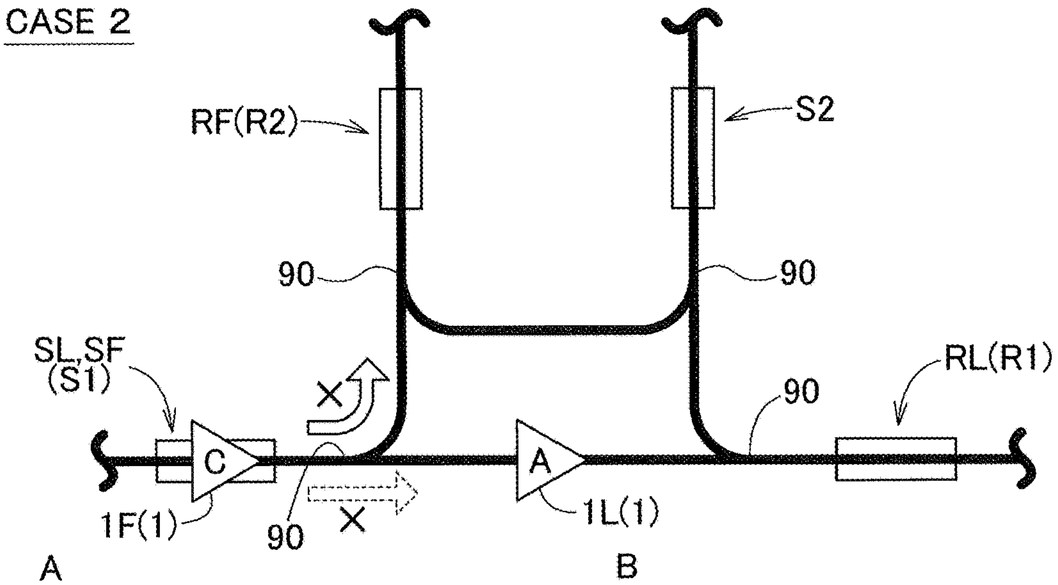
FIG. 5 is a view illustrating a control in the specific section.

FIG. 5 illustrates a case 2. In the case 2, the transport vehicle A enters the specific section Z first, and a transport vehicle Centers the specific section Z after that. Accordingly, the transport vehicle A is the leading transport vehicle 1L, and the transport vehicle C is the following transport vehicle 1F. The first stop point S1 as an entrance for the leading transport vehicle A is the leading stop point SL, and the first stop point S1 as an entrance for the following transport vehicle C is the following stop point SF. The first passage point R1 as an exit for the leading transport vehicle A is the leading passage point RL, and the second passage point R2 as an exit for the following transport vehicle C is the following passage point RF.

In the case 2 illustrated in FIG. 5, the following stop point SF as the entrance for the following transport vehicle C is the first stop point S1, and the leading stop point SL as the entrance for the leading transport vehicle A is the first stop point S1. Accordingly, the entrances for the following transport vehicle B and the leading transport vehicle A are the same point. In the meantime, the following passage point RF as the exit for the following transport vehicle C is the second passage point R2, and the leading passage point RL as the exit for the leading transport vehicle A is the first passage point R1. Accordingly, the exits for the following transport vehicle C and the leading transport vehicle A are different from each other. However, as described above, the following stop point SF and the leading stop point SL are the same point, i.e., the first stop point S1.

Accordingly, the traveling of the following transport vehicle C in a direction indicated by a solid-line arrow in FIG. 5 is not permissible as the following transport vehicle C is likely to interfere with the leading transport vehicle A. For example, in a case where the leading transport vehicle A stops at an intersection 90 (a branching-off point) downstream from the first stop point S1 or its vicinal area, even if the following transport vehicle C is to travel on a path different from the leading transport vehicle A, the following transport vehicle C and the leading transport vehicle A may interfere with each other. Accordingly, the section control system 2 transmits a stop command to the following transport vehicle C without giving a passage permission thereto. That is, in a case where the following stop point SF and the leading stop point SL are the same point, the section control system 2 transmits, to the following transport vehicle 1F, a stop command to stop at the following stop point SF, without giving a passage permission to pass through the following passage point RF to the following transport vehicle 1F.

Note that the traveling of the following transport vehicle C in a direction indicated by a broken-line arrow in FIG. 5 is also not permissible. This is because, even in this case, it doesn't change the fact that the following stop point SF and the leading stop point SL are the same point, i.e., the first stop point S1. Rather in this case, the following transport vehicle C travels on the same path as the path where the leading transport vehicle A travels, so that the possibility of interference with the leading transport vehicle A increases. Accordingly, the section control system 2 transmits a stop command to the following transport vehicle C without giving a passage permission thereto. That is, in a case where the following stop point SF is the same as the leading stop point SL, or in a case where the following passage point RF is the same as the leading passage point RL, the section control system 2 transmits, to the following transport vehicle 1F, a stop command to stop at the following stop point SF, without giving a passage permission to pass through the following passage point RF to the following transport vehicle 1F.

The section control system 2 controls the following transport vehicle 1F in the specific section Z in the manner as described above. Hereby, while the leading transport vehicle 1L is in the specific section Z, the section control system 2 gives a passage permission to the following transport vehicle 1F depending on the situation, rather than always stopping the following transport vehicle 1F. Hereby, a plurality of transport vehicles 1 can smoothly pass through the specific section Z.

In the present embodiment, the section control system 2 is configured to perform a recording process and a comparison process.

The recording process is a process of recording respective stop points S of a plurality of transport vehicles 1 as respective entrances to the specific section Z and respective passage points R thereof as respective exits from the specific section Z in order of entry of the plurality of transport vehicles 1 into the specific section Z. Information acquired by the recording process is recorded in the storage section 20 (see FIG. 2). In the present example, in the recording process, whether each of the transport vehicles 1 is the leading transport vehicle 1L or the following transport vehicle 1F is determined based on the order of entry of the transport vehicles 1 into the specific section Z, and the leading stop point SL, the following stop point SF, the leading passage point RL, and the following passage point RF are also determined based on the order of entry of the transport vehicles 1 into the specific section Z.

The comparison process is a process of determining by comparison whether the stop points S recorded by the recording process for the plurality of transport vehicles 1 are the same or not and whether the passage points R recorded by the recording process for the plurality of transport vehicles 1 are the same or not. In the present example, the leading stop point SL, the following stop point SF, the leading passage point RL, and the following passage point RF are recorded in the storage section 20 by the recording process. In the comparison process performed after that, whether the leading stop point SL and the following stop point SF are the same or not, and whether the leading passage point RL and the following passage point RF are the same or not are determined by comparison.

The section control system 2 determines whether or not the passage permission is issuable or not, based on the order of entry into the specific section Z and a result of the comparison process.

In the present embodiment, in a case where an exclusive-passage condition is satisfied, the section control system 2 allows a transport vehicle 1 making a passage permission request to exclusively pass through the passage point R as a request target of the passage permission request.

The exclusive-passage condition is that any of the following conditions is satisfied: (1) no transport vehicle 1 other than the transport vehicle 1 making the passage permission request is present in the specific section Z (a first condition); (2) in a case where a plurality of transport vehicles 1 is present in the specific section Z, the transport vehicle 1 making the passage permission request is the leading transport vehicle 1L that enters the specific section Z first (a second condition); and (3) in a case where a plurality of transport vehicles 1 is present in the specific section Z, and the transport vehicle 1 making the passage permission request is the following transport vehicle 1F, the following stop point SF is different from the leading stop point SL, and the following passage point RF is different from the leading passage point RL (a third condition).

Although details are not illustrated herein, in a case where the first condition is satisfied, only one transport vehicle 1 is present in the specific section Z, and therefore, interference between transport vehicles 1 cannot occur. Accordingly, the section control system 2 gives a passage permission to the transport vehicle 1.

In the cases illustrated in FIGS. 4 and 5, the transport vehicle A satisfies the second condition. That is, in the specific section Z, there is a transport vehicle 1 (the transport vehicle B or the transport vehicle C) other than the transport vehicle A, but the transport vehicle A is the leading transport vehicle 1L entering the specific section Z first. Accordingly, the transport vehicle A satisfies the second condition, and the section control system 2 gives a passage permission to the transport vehicle A.

In the example illustrated in FIG. 4, the transport vehicle B satisfies the third condition. That is, the transport vehicle A enters the specific section Z earlier than the transport vehicle B, and therefore, the transport vehicle B is the following transport vehicle 1F. However, the following stop point SF is different from the leading stop point SL, and the following passage point RF is different from the leading passage point RL. Accordingly, the transport vehicle B satisfies the third condition, and the section control system 2 gives a passage permission to the transport vehicle B.

Note that, in the example illustrated in FIG. 5, the transport vehicle C does not satisfy any of the first to third conditions. Accordingly, the section control system 2 transmits a stop command to the transport vehicle C without giving a passage permission thereto.

OTHER EMBODIMENTS

Next will be described other embodiments.

(1) The above embodiment has described an example in which the entrance to the specific section Z includes two stop points, i.e., the first stop point S1 and the second stop point S2, and the exit from the specific section Z includes two passage points, i.e., the first passage point R1 and the second passage point R2. However, the present invention is not limited to such an example, and there are three or more entrances to the specific section Z (i.e., three or more stop points S). Besides, there are three or more exits from the specific section Z (i.e., three or more passage points R).

(2) The above embodiment has described an example in which the transport vehicle 1 is an unmanned transport vehicle. However, the present invention is not limited to such an example, and the transport vehicle 1 may be an AGV (unmanned transport vehicle) or a guided vehicle, for example. In a case where the transport vehicle 1 is an AGV, the travel path 9 is an electromagnetic tape provided on a floor surface or a virtual path using a two-dimensional code or the like.

(3) Note that the configuration disclosed in the above embodiment can be applied in combination with the configurations disclosed in other embodiments as long as no inconsistency occurs. In terms of other configurations, the embodiment disclosed in the present specification is also just an example in all respects. Accordingly, various modifications can be made appropriately as far as it does not deviate from the scope of this disclosure.

OVERVIEW OF PRESENT EMBODIMENT

The following will describe the overview of the present embodiment.

A transport facility includes: at least one transport vehicle; a travel path on which the at least one transport vehicle travels; and a section control system configured to transmit a passage permission or a stop command to the at least one transport vehicle traveling on a specific section defined in the travel path and control the at least one transport vehicle. The specific section includes at least one stop point, at which the at least one transport vehicle stops in response to the stop command, and at least one passage point, through which the at least one transport vehicle receiving the passage permission passes. The at least one stop point includes a first stop point and a second stop point as different entrances to the specific section. The at least one passage point includes a first passage point and a second passage point as different exits from the specific section. The first passage point and the second passage point are placed downstream from the first stop point and the second stop point in the travel path. The at least one vehicle includes: a leading transport vehicle entering the specific section first to pass through a leading stop point as the at least one stop point and a leading passage point as the at least one passage point; and a following transport vehicle entering the specific section subsequently to the leading transport vehicle to pass through a following stop point as the at least one stop point and a following passage point as the at least one passage point. The section control system is configured to give the following transport vehicle a passage permission to pass through the following passage point in a case where the following stop point is different from the leading stop point, and the following passage point is different from the leading passage point at a time when the section control system receives a passage permission request on the first passage point or the second passage point from the following transport vehicle after the section control system gives the leading transport vehicle a passage permission to pass through the first passage point or the second passage point.

In this configuration, in a case where the following stop point is different from the leading stop point, and the following passage point is different from the leading passage point, the section control system gives the following transport vehicle a passage permission to pass through the following passage point. On this account, not only the leading transport vehicle but also the following transport vehicle can pass through the specific section, thereby making it possible to allow a plurality of transport vehicles present in the specific section at the same timing to smoothly pass through the specific section. With this configuration, it is possible to allow a plurality of transport vehicles to smoothly pass through a section including a plurality of intersections close to each other.

The at least one vehicle may include a plurality of transport vehicles. The section control system may perform a recording process of recording respective stop points of the plurality of transport vehicles as respective entrances to the specific section and respective passage points of the plurality of transport vehicles as respective exits from the specific section in order of entry of the plurality of transport vehicles into the specific section, and a comparison process of determining by comparison whether the respective stop points recorded by the recording process for the plurality of transport vehicles are the same or not and whether the respective passage points recorded by the recording process for the plurality of transport vehicles are the same or not. The section control system may determine whether the passage permission is issuable or not, based on the order of entry into the specific section and a result of the comparison process.

In this configuration, it is possible to determine whether the passage permission to pass through the specific section is issuable or not, based on three indices, i.e., the order of entry into the specific section, an entrance to the specific section, and an exit from the specific section. Accordingly, it is possible to determine whether or not the passage permission is issuable or not, with a relatively simple control configuration.

INDUSTRIAL APPLICABILITY

The technology according to this disclosure is applicable to a travel facility including: a transport vehicle; a travel path on which the transport vehicle travels; and a section control system configured to transmit a passage permission or a stop command to a transport vehicle traveling on a specific section defined in the travel path and control the transport vehicle.

What is claimed is:

1. A transport facility, comprising:

at least one transport vehicle;

a travel path on which the transport vehicle travels; and a section control system configured to transmit a passage permission or a stop command to the at least one transport vehicle traveling on a specific section defined in the travel path and control the at least one transport vehicle, and wherein:

the specific section comprises at least one stop point, at which the at least one transport vehicle stops in response to the stop command, and at least one passage point, through which the at least one transport vehicle receiving the passage permission passes, the at least one stop point comprises a first stop point and a second stop point as different entrances to the specific section, the at least one passage point comprises a first passage point and a second passage point as different exits from the specific section, the first passage point and the second passage point are placed downstream from the first stop point and the second stop point in the travel path, the at least one vehicle comprises:

a leading transport vehicle entering the specific section first to pass through a leading stop point as the at least one stop point and a leading passage point as the at least one passage point; and a following transport vehicle entering the specific section subsequently to the leading transport vehicle to pass through a following stop point as the at least one stop point and a following passage point as the at least one passage point, and the section control system is configured to give the following transport vehicle a passage permission to pass through the following passage point in a case where the following stop point is different from the leading stop point, and the following passage point is different from the leading passage point at a time when the section control system receives a passage permission request on the first passage point or the second passage point from the following transport vehicle after the section control system gives the leading transport vehicle a passage permission to pass through the first passage point or the second passage point.

2. The transport facility according to claim 1, wherein:

the at least one vehicle includes a plurality of transport vehicles, the section control system performs:

a recording process of recording respective stop points of the plurality of transport vehicles as respective entrances to the specific section and respective passage points of the plurality of transport vehicles as respective exits from the specific section in order of entry of the plurality of transport vehicles into the specific section, and a comparison process of determining by comparison whether the respective stop points recorded by the recording process for the plurality of transport vehicles are the same or not and whether the respective passage points recorded by the recording process for the plurality of transport vehicles are the same or not, and the section control system determines whether the passage permission is issuable or not, based on the order of entry into the specific section and a result of the comparison process.

* * * * *